United States Patent [19]
Austin

[11] 4,101,409
[45] Jul. 18, 1978

[54] ELECTROLYTIC FLOTATION APPARATUS

[75] Inventor: Eric Paul Austin, Sandbach, England

[73] Assignee: Simon-Hartley Limited, Staffordshire, England

[21] Appl. No.: 790,807

[22] Filed: Apr. 25, 1977

[30] Foreign Application Priority Data

May 12, 1976 [GB] United Kingdom ............... 19515/76

[51] Int. Cl.² .......................... C02B 1/82; C02B 1/20
[52] U.S. Cl. .................... 204/277; 204/149; 204/152; 210/44
[58] Field of Search ............... 204/149, 152, 269, 277, 204/276, 275; 210/44

[56] References Cited
U.S. PATENT DOCUMENTS

| | | | |
|---|---|---|---|
| 3,925,176 | 12/1975 | Okert | 204/152 |
| 3,926,754 | 12/1975 | Lee | 204/152 |
| 3,975,247 | 8/1976 | Stralser | 204/152 |

*Primary Examiner*—Arthur C. Prescott
*Attorney, Agent, or Firm*—Norris & Bateman

[57] ABSTRACT

A method for treating a liquid wherein the liquid to be treated is caused to flow through a tank equipped with at least one electrode assembly in the base thereof for the generation of gas bubbles by electrolytic action, whereby suspended materials, usually but not necessarily solids, in the liquid are carried to the surface of the tank by said bubbles to form a layer of thickened material, characterised by the step of dissolving air under pressure into the liquid before it is caused to flow through said tank, whereby the amount of gas available for flotation purposes exceeds that available from the electrolytic action alone.

2 Claims, 2 Drawing Figures

ELECTROLYTIC FLOTATION APPARATUS

THIS INVENTION concerns a method of treating a liquid, such as activated sludge for example, and of the kind (hereinafter termed of the kind referred to) wherein the liquid to be treated is caused to flow through a tank equipped with at least one electrode assembly in the base thereof for the generation of gas bubbles by electrolytic action, whereby suspended materials, usually but not necessarily solids, in the liquid are carried to the surface of the tank by said bubbles to form a layer of thickened material, and also apparatus for performing such method.

We have found that when certain liquids are treated by a method of the kind referred to adequate degrees of flocculation can occur from the effect of the electric field of the electrode assembly on the liquid without generation of sufficient gas bubbles by electrolytic action for flotation purposes. To increase the volume of gas available by electrolytic action when otherwise adequate electro-flocculation takes place is clearly wasteful.

It is an object of the present invention to provide a method and apparatus for treatment of liquids which overcomes the difficulty aforesaid.

According to the present invention a method for treatment of a liquid and of the kind referred to is characterised by the step of dissolving air under pressure into the liquid before it is caused to flow through said tank, whereby the amount of gas available for flotation purposes exceeds that available from the electrolytic action alone.

The invention also includes apparatus for carrying out the method aforesaid.

The invention will be further apparent from the following description with reference to the figures of the accompanying drawing, which show by way of example only, one form of apparatus embodying the invention and for practising the method thereof.

Figure 1:
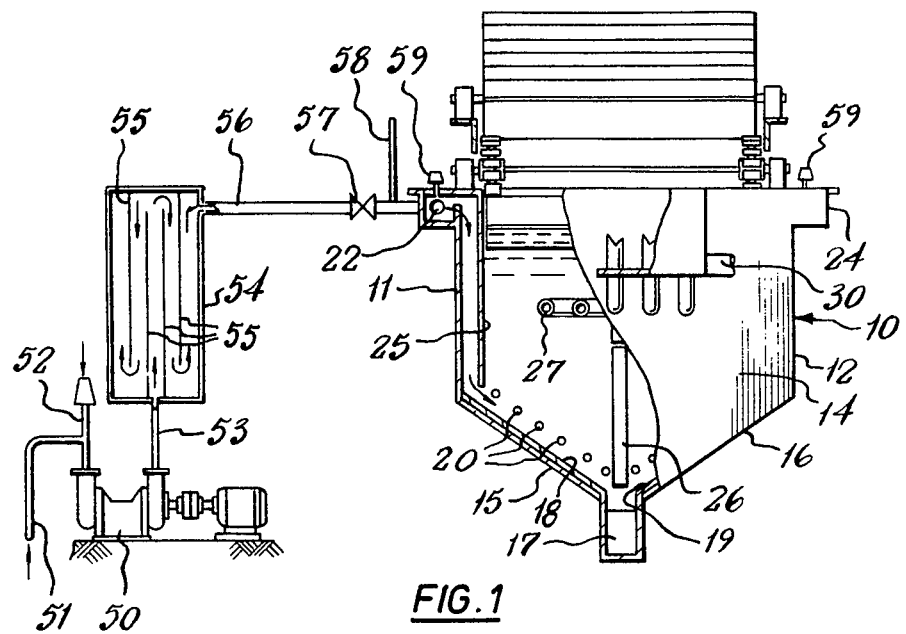
FIG. 1 shows a partially sectioned end elevation of the apparatus.

Referring now to the drawing it will be seen that the apparatus essentially comprises a tank generally indicated at 10 and comprised by oppositely disposed parallel side walls 11 and 12, end walls 13 and 14 and base plates 15 and 16. The base plates 15 and 16 slope inwardly and downwardly from the lower edges of the side walls 11 and 12 respectively, whereby the depth of the tank 10 increases gradually across its width from both of its sides to a maximum at the centre of the tank. The inner lower edges of the base plates 15 and 16 define the upper ends of a channel 17, running longitudinally of the tank 10 and connecting with the interior thereof and whose depth increases gradually from one end of the tank to the other.

Within the tank 10 are two cathodes 18 and 19 disposed over the base plates 15 and 16 respectively in parallel relationship therewith. Spaced above each of the cathodes 18 and 19 are a plurality of longitudinally extending spaced parallel bars 20 forming anodes. The anode bars 20 are supported in position to form grids whose planes are parallel with the cathodes 18 and 19 respectively, by means of insulating support members 21, mounted on the upper surfaces of the cathodes 18 and 19.

The width of each of the electrode assemblies defined by the width of each grid constituted by the spaced anode bars lies in the range of from 0.5 to 1.5 meters.

The liquid to be treated is supplied, after pre-treatment as described hereinafter, via feed pipes 22 into distribution mains 23 and 24 running along the length of the tank 10 at the upper ends of the side walls 11 and 12 respectively.

Figure 2:
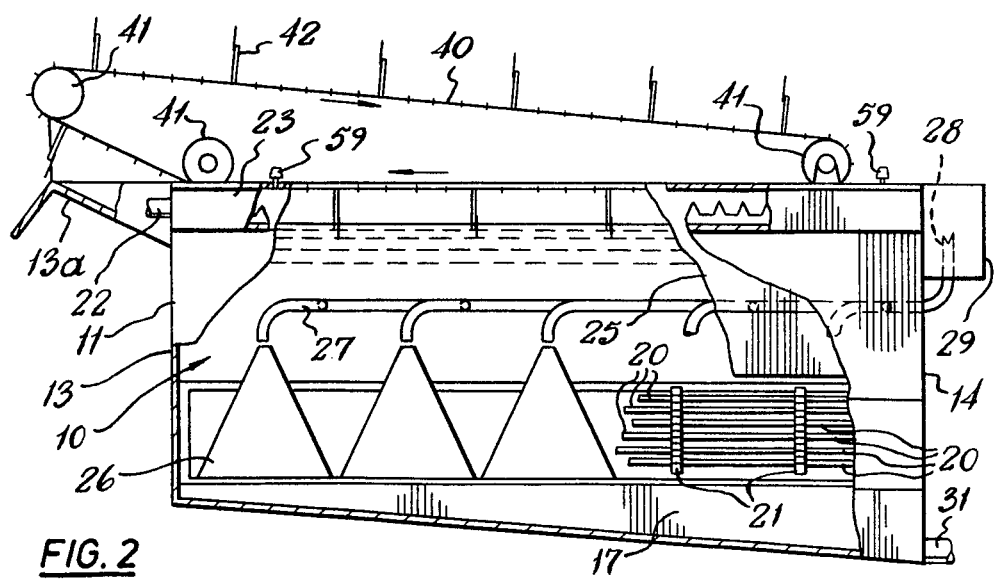
FIG. 2 shows a partially sectioned side elevation of the apparatus of FIG. 1.

The liquid flows into the body of the tank from the mains 23 and 24 over the upper edges of the side walls 11 and 12 which define weirs for this purpose. The upper edges of the side walls 11 and 12 are, as best seen in FIG. 2, provided with a serrated profile to ensure that the liquid is substantially evenly distributed over the length of the tank 10 on either side thereof.

Inwardly spaced from the side walls 11 and 12 are parallel depending baffle plates 25 extending longitudinally over the length of the tank, whose lower ends are disposed adjacent the upper ends of the grids defined by the anodes 20, whereby the inflowing liquid is introduced into the body of the tank 10 for downward flow through the spaces in the electrode assemblies between the cathodes and anode grids thereof.

A plurality of nozzles 26 of fishtail from are provided and disposed in side-by-side relationship with their orifices directed downwardly along the length of the tank 10 above the channel 17 and located at a position between the inner lower edges of the two cathodes 18 and 19 and lowermost anode bars 20 of the two anode grids, at a level coinciding with the spaces in the electrode assemblies between the cathodes and anode grids thereof.

Each nozzle 26 connects with a pipe 27 which extends out of the body of the tank 10 to terminate in an upright portion 28 disposed within an overflow box 29. The upper ends of the portions 28 are positioned at a level slightly below the desired level of liquid in the tank 10.

Means to remove thickened material from the surface of the liquid contained within the tank 10 is provided and comprises endless chains 40 supported on sprocket wheels 41 at opposite sides of the tank 10, there being a plurality of spaced transversely extending scraper blades 42 between the two chains 40 on the opposite sides of the tank.

The chains are adapted to be driven in the direction of the arrows so that the scraper blades 42, whose lower edges dip into the surface of the contents of the tank, are drawn longitudinally of the tank to gather thickened material and move it towards an inclined upper terminal portion 13a of the end wall 13. The sprocket wheels 41 are so disposed that adjacent the end of the tank 10, defined by the wall 13, the blades 42 travel in an inclined direction to draw the collected thickened material over the portion 13a to drop from the end thereof into suitable collecting means (not shown).

Referring now to FIG. 1, it will be seen that a liquid to be treated, such as activated sludge for example, is fed into the distribution means 23 and 24 by means of a pump 50. The liquid is supplied to the pump 50 through a line 51 and air is entrained with same by means of an air bleed line 52. The liquid with entrained air leaves the pump 50 through a line 53 which communicates with a cylindrical chamber 54 fitted with internal cylindrical baffles 55 which define an extended flowpath for the liquid within the chamber 54, the liquid leaving the chamber 54 by a line 56 which communicates with the feed pipes 22 for the distribution mains 23 and 24 via a pressure reducing valve 57. The design of the chamber 54 and its internal baffles 55 is such as to ensure that the liquid has a sufficiently great residence time before passing to the tank 10 to allow for the entrained air to be dissolved into the liquid. It will be understood that the action of the pump will ensure that the liquid in the chamber 54 is at a substantial pressure, of the order of 75 psig, ensuring that the entrained air is taken into solution.

As the liquid enters the distribution mains 23 and 24 its pressure is reduced by means of the valve 57 to a relatively low value of the order of 5 psig. The liquid entering the tank 10 is introduced substantially evenly along the length of the two electrode assemblies for downward flow through the spaces between the cathodes and anode grids thereof. An electrical potential difference is established between the cathodes and anodes. Suspended materials within the liquid to be treated tend to flocculate under the influence of the electric field, and gas bubbles generated by the electrolytic action and also by the air coming out of solution in the reduced pressure environment, attach to the flocs to carry them to the surface to form the thickened sludge material which is harvested in the manner described above.

The treated liquid is gathered into the nozzles 26 as it emerges from the electrode assemblies and flows into the box 29 under the action of hydrostatic pressure and is conveyed away through a pipe 30 connecting with the box 29.

Any sediment which tends to collect in the base of the tank is displaced by the washing action of the incoming liquid and gravity into the channel 17 which can be cleared continuously or at periodic intervals by means of the outlet 31.

In certain application the tendency of the suspended material within the liquid to flocculate can be enhanced by the addition of a suitable flocculating agent such as a polyelectrolyte for example, which can be injected into the liquid by means of a line 58 communicating with the line 56 on the low pressure side of the valve 57.

An air relief valve 59 is provided on each of the distribution mains 23 and 24 to vent to atmosphere any air which collects in these mains.

It will be appreciated that it is not intended to limit the invention to the above example only, many variations such as might readily occur to one skilled in the art being possible without departing from the scope thereof.

Thus, for example, two electrode assemblies need not be provided in a common tank, and a single electrode assembly may be provided in the tank which may be one of a variety of shapes.

Whilst it is preferred to arrange for the liquid to be treated to flow downwardly over the or each electrode assembly, it would be possible for such to flow upwardly over the or each electrode assembly which would then be inclined upwardly from the position at which the liquid to be treated was fed thereto.

It will be understood that by the term electrode assembly as used throughout the specification we mean that assembly of electrical current carrying members across which the liquid or a portion of the liquid to be treated flows during its passage through the tank. Thus the or each electrode assembly may be comprised by one or more units each having at least one cathode and one anode.

What is claimed is:

1. Apparatus for the treatment of a liquid comprising a tank equipped with at least one electrode assembly in the base thereof for the generation of gas bubbles by electrolytic action, means for supplying the liquid to be treated to the tank for flow therethrough, means for collecting the treated liquid from the tank and means for gathering thickened material which collects on the surface of the liquid within the tank, characterised in that the means for supplying the liquid to be treated to the tank includes a line having a high pressure section and a low pressure section separated by a pressure reducing valve located immediately prior to the connection between said line and the tank, means for pumping the liquid through the line and means for bleeding air into the high pressure section of the line.

2. Apparatus according to claim 1 wherein the high pressure section of the line incorporates a chamber provided with baffles to give an extended flow path.

* * * * *